(12) United States Patent
Strang

(10) Patent No.: US 10,466,358 B2
(45) Date of Patent: Nov. 5, 2019

(54) AUTOMATICALLY DISPLACEABLE CLEANING DEVICE

(71) Applicant: Vorwerk & Co. Interholding GmbH, Wuppertal (DE)

(72) Inventor: Benjamin Strang, Solingen (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 279 days.

(21) Appl. No.: 15/531,774

(22) PCT Filed: Dec. 1, 2015

(86) PCT No.: PCT/EP2015/078135
§ 371 (c)(1),
(2) Date: May 31, 2017

(87) PCT Pub. No.: WO2016/096394
PCT Pub. Date: Jun. 23, 2016

(65) Prior Publication Data
US 2017/0269212 A1    Sep. 21, 2017

(30) Foreign Application Priority Data

Dec. 15, 2014 (DE) .................. 10 2014 118 605
Jan. 19, 2015 (DE) .................. 10 2015 100 706

(51) Int. Cl.
*G01S 17/48* (2006.01)
*G01S 17/93* (2006.01)
(Continued)

(52) U.S. Cl.
CPC .............. *G01S 17/48* (2013.01); *A47L 9/009* (2013.01); *A47L 9/2805* (2013.01);
(Continued)

(58) Field of Classification Search
CPC ...................... A47L 2201/04; A47L 2201/06
See application file for complete search history.

(56) References Cited

U.S. PATENT DOCUMENTS

| 5,124,859 A | 6/1992 | Martin et al. |
| 6,034,820 A | 3/2000 | Someno et al. |
(Continued)

FOREIGN PATENT DOCUMENTS

| DE | 198 13 456 A1 | 10/1998 |
| DE | 10 2008 014 912 A1 | 9/2009 |
| WO | 00/08512 A1 | 2/2000 |

OTHER PUBLICATIONS

International Search Report of PCT/EP2015/078135, dated Feb. 10, 2016.

*Primary Examiner* — Andrew A Horton
(74) *Attorney, Agent, or Firm* — Collard & Roe, P.C.

(57) ABSTRACT

An automatically movable cleaning device, in particular an electric-motor-driven vacuuming and/or wiping robot, comprising a distance-measuring device for measuring the distance of the cleaning device from an object, wherein the distance-measuring device has an optical triangulation system, which has a light source, an optical filter, and a detector, which are arranged in such a way that light in a propagation direction, emitted by the light source, is first scattered by the object, wherein at least a portion of the scattered light is then spectrally filtered by means of the optical filter and wherein the filtered light is finally detected by the detector. For advantageous development, the optical filter according to the invention is a band-stop filter having a reflectivity of at least 90% with respect to at least one wavelength of the scattered light, and/or the optical filter is a band-pass filter, a reflector being arranged after the band-pass filter in the transmission direction, and/or the optical filter is a cut-off (Continued)

filter having a reflectivity of at least 90% with respect to at least one wavelength of the scattered light.

8 Claims, 4 Drawing Sheets

(51) Int. Cl.
*G01S 7/481* (2006.01)
*G02B 5/26* (2006.01)
*G02B 5/28* (2006.01)
*A47L 9/28* (2006.01)
*A47L 9/30* (2006.01)
*G05D 1/02* (2006.01)
*A47L 9/00* (2006.01)

(52) U.S. Cl.
CPC ............... *A47L 9/2852* (2013.01); *A47L 9/30* (2013.01); *G01S 7/4816* (2013.01); *G01S 7/4817* (2013.01); *G01S 17/936* (2013.01); *G02B 5/26* (2013.01); *G02B 5/28* (2013.01); *G05D 1/024* (2013.01); *G05D 1/0231* (2013.01); *A47L 2201/04* (2013.01); *G05D 2201/0203* (2013.01); *G05D 2201/0215* (2013.01)

(56) References Cited

U.S. PATENT DOCUMENTS

| | | |
|---|---|---|
| 6,122,106 A | 9/2000 | Noyes et al. |
| 2010/0234998 A1* | 9/2010 | Kim ..................... A47L 9/2805 700/259 |

* cited by examiner

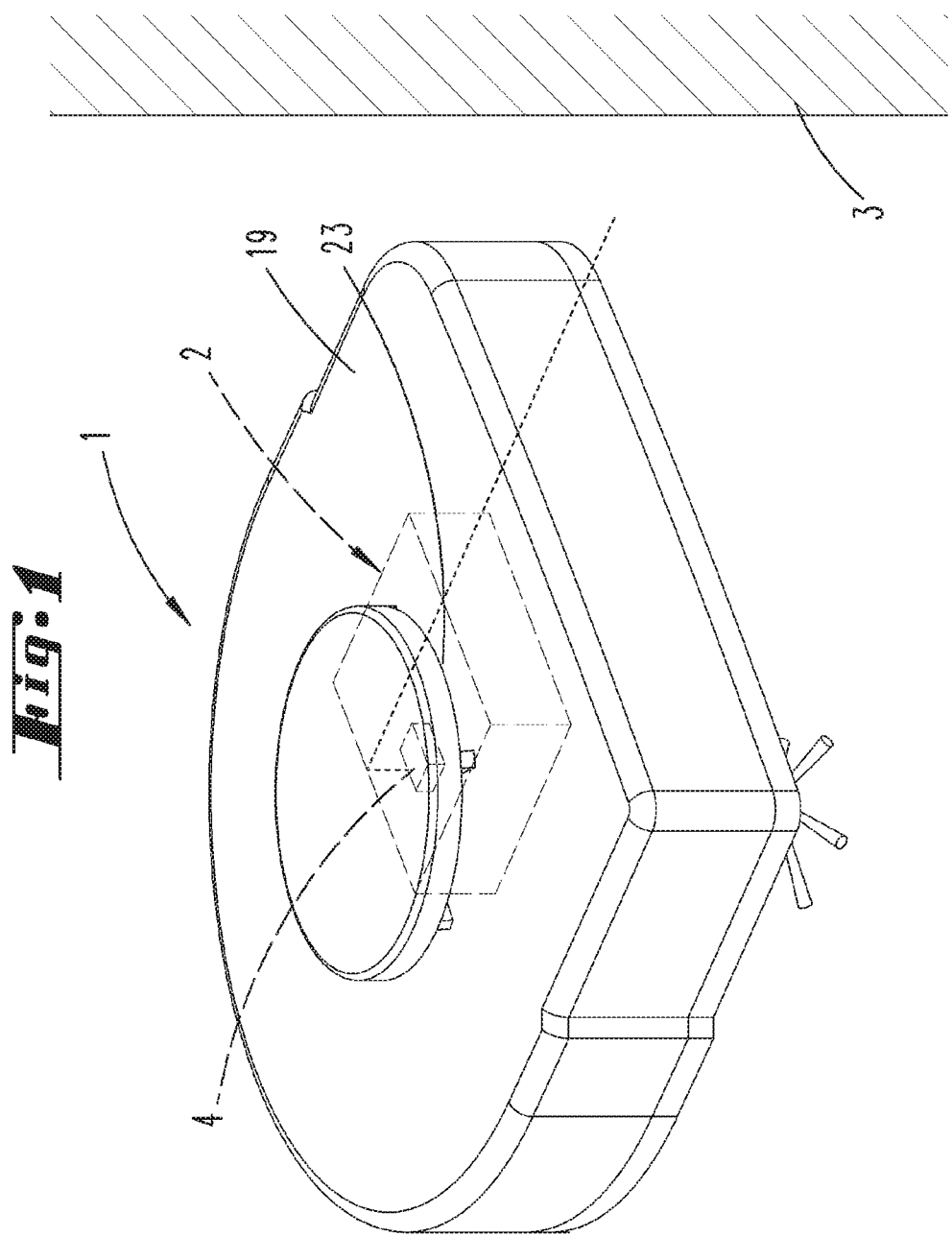

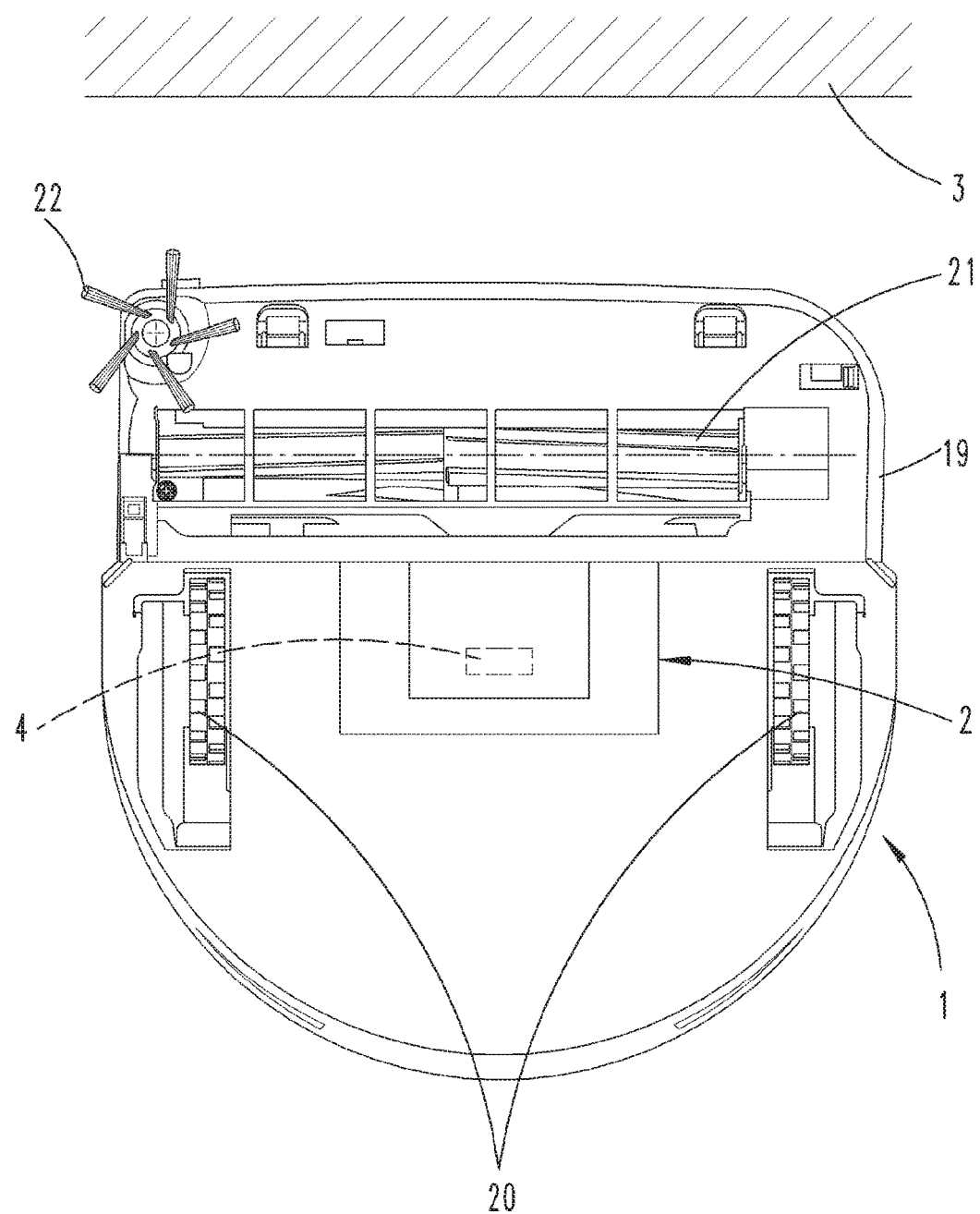

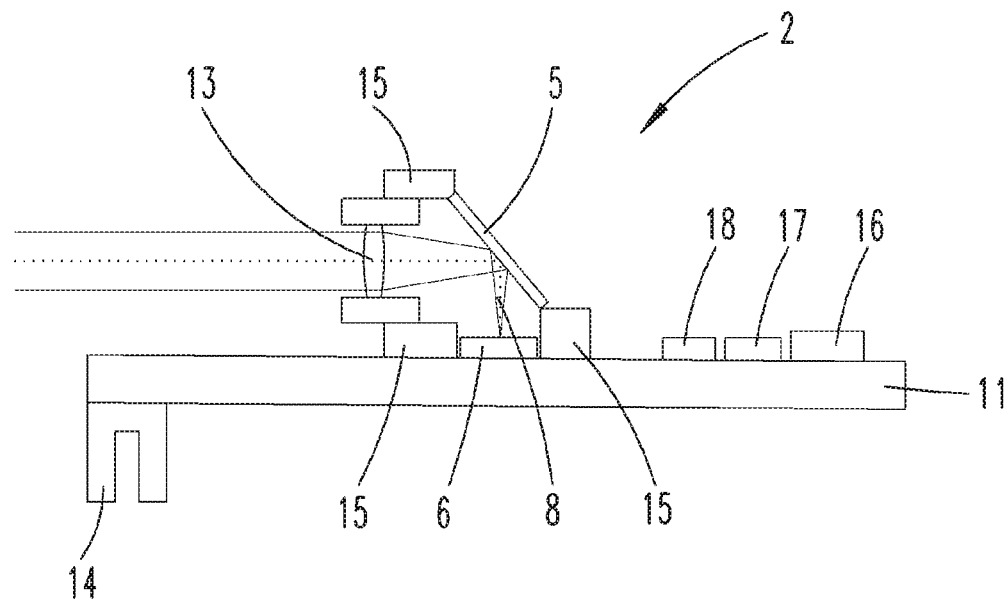
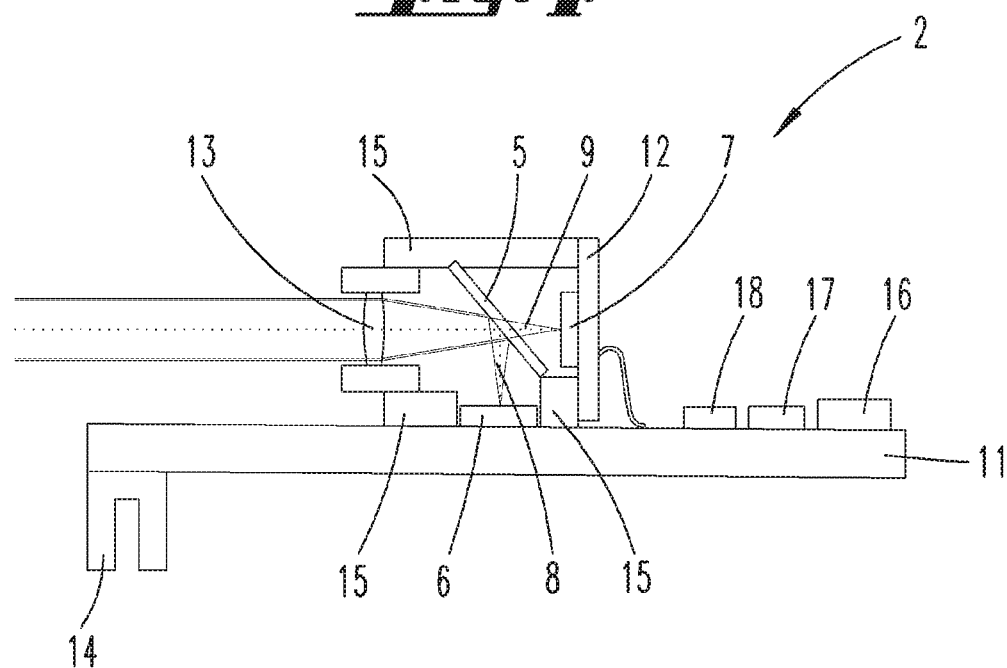

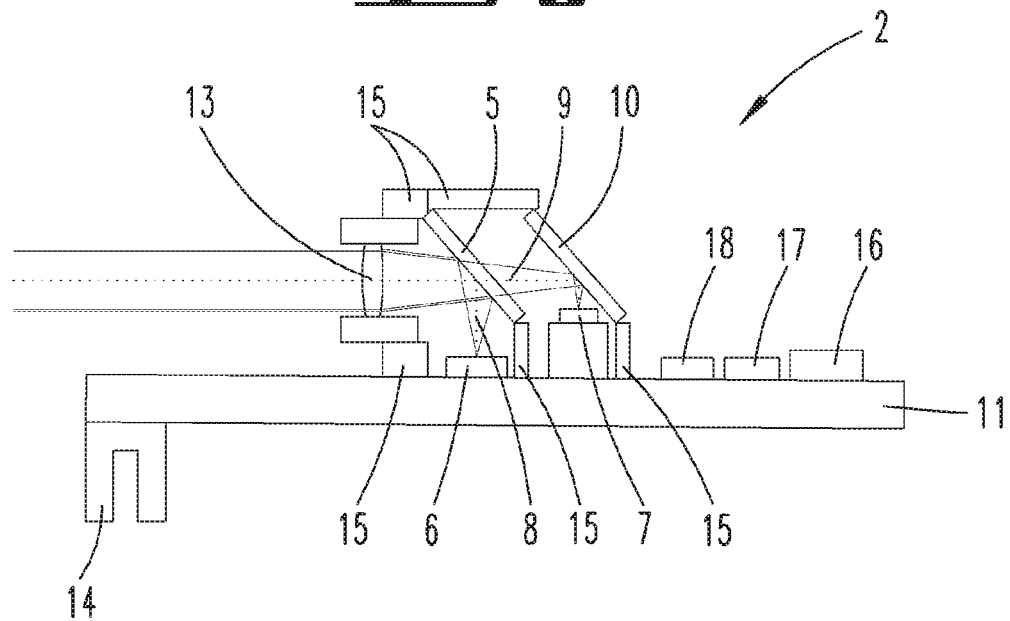
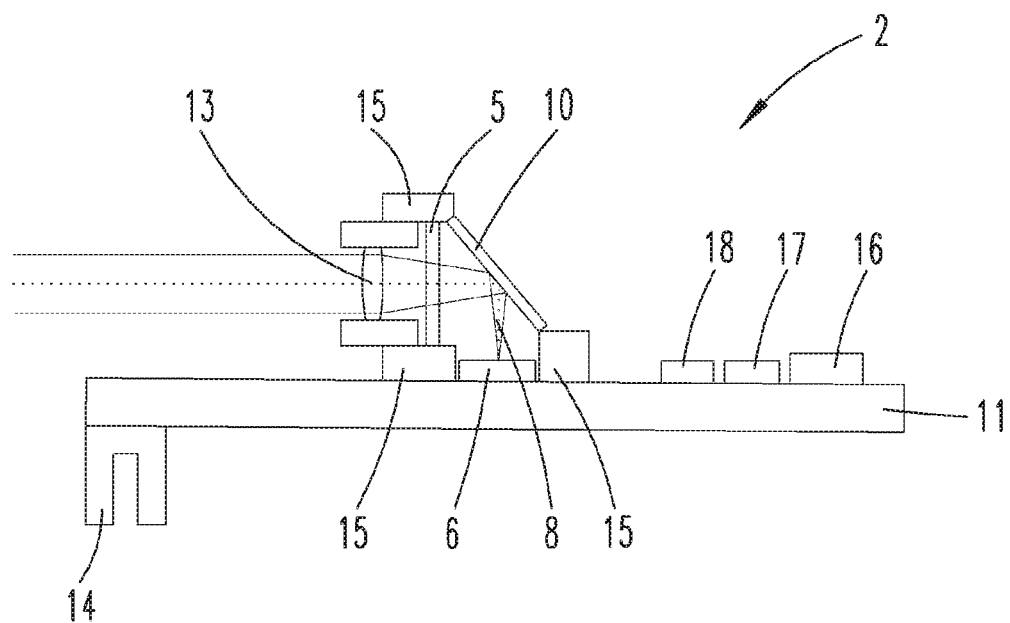

AUTOMATICALLY DISPLACEABLE CLEANING DEVICE

CROSS REFERENCE TO RELATED APPLICATIONS

This application is the National Stage of PCT/EP2015/078135 filed on Dec. 1, 2015, which claims priority under 35 U.S.C. § 119 of German Application No. 10 2014 118 605.2 filed on Dec. 15, 2014 and German Application No. 10 2015 100 706.1 filed Jan. 19, 2015, the disclosures of which are incorporated by reference. The international application under PCT article 21(2) was not published in English.

The invention relates to an automatically displaceable cleaning device, in particular to an electric motor-driven vacuuming and/or wiping robot, with a distance measuring device for measuring the distance of the cleaning device from an object, wherein the distance measuring device exhibits an optical triangulation system with a light source, an optical filter and a detector, which are arranged in such a way that light emitted by the light source in the propagation direction is first scattered by the object, wherein at least a portion of the scattered light is subsequently spectrally filtered by the optical filter, and wherein the filtered light is finally detected by the detector.

Automatically displaceable cleaning devices with such a distance measuring device are known in prior art. The cleaning device is automatically displaced, for example in a home, and in the process records distance data for the environment. Known for this purpose is to provide the distance measuring device with means for all-around distance measurement (360°), e.g., in the form of an optical triangulation system, which is arranged on a platform that can rotate around a vertical axis or the like.

For example, publication DE 10 2008 014 912 A1 discloses an automatically displaceable cleaning device with a distance measuring device for measuring the distance of a cleaning device from an object, for example an obstacle like a wall or piece of furniture. The distance measuring device exhibits a triangulation system whose light source shines light onto the object to be measured. The measurement takes place from two different positions of the cleaning device, wherein the distance of the object from the cleaning robot can be derived based upon the angle of the light scattered (reflected) by the object. As a consequence, the cleaning device receives information about the distance from obstacles, so that it can adjust its displacement strategy thereto, and avoid contact with obstacles in advance.

The known triangulation systems have a light source, an optical filter and a detector. For example, the light source is an optical laser diode. The optical filter is usually a bandpass filter, which is designed to transmit, i.e., allow through, the light emitted by the light source, and block, i.e., reflect or absorb, ambient light. The mean frequency of the bandpass filter, i.e., the geometric mean (or approximately the arithmetic mean) between the lower and upper limit frequency of the filter frequency band, advantageously corresponds to the laser wavelength.

The disadvantage to the used optical filters is that the latter often exhibit just a slight transmittance. A bandpass filter that exhibits a mean frequency corresponding to the wavelength of 785 nm and is designed as an interference filter usually has a transmittance of at most 90%. Accordingly, a larger percentage, namely at least 10%, of the light is reflected and/or absorbed, and does not contribute to the detection result. As a consequence, the signal strength of the signal received by the detector is reduced, which can influence measuring accuracy.

In addition, a conventionally constructed distance measuring device inside the cleaning device makes it necessary to arrange the optical filter, namely the bandpass filter, and the detector on two separate circuit boards located orthogonally to each other. The bandpass filter is here located on a first circuit board, while the detector is located on a second circuit board situated perpendicular thereto. This arrangement inevitably results from the transmitting property of the bandpass filter, wherein the transmitted light propagates parallel to the first circuit board through the bandpass filter, and then impinges upon the detector situated perpendicular to the beam direction, and hence also perpendicular to the first circuit board. As a consequence, the disadvantage to prior art is that the electrical components are divided between two separate circuit boards. The multicore electrical connection between the two circuit boards associated therewith is soldered or put together by hand, and is hence error-prone.

Therefore, the object of the invention is to create a cleaning device with a distance measuring device in which the above disadvantages are avoided.

As a solution, the invention initially proposes an automatically displaceable cleaning device with a distance measuring device, in which the optical filter is a band stop filter with a reflectance of at least 90% in relation to at least one wavelength of the scattered light.

According to the invention, the bandpass filter used in prior art in generating the triangulation system is now replaced by a band stop filter. As a consequence, the light impinging on the optical filter is now no longer transmitted by the optical filter, but rather is reflected by the optical filter. This changes the propagation direction of the light scattered by the object. If the optical triangulation system is situated in such a way relative to the circuit board that the light scattered by the object propagates parallel to the circuit board before impinging upon the optical filter, the light is now deflected by the reflecting optical filter, i.e., the band stop filter, and propagates in a direction perpendicular to the circuit board, so that the detector can now be situated directly on the same circuit board, and no second circuit board is required for accommodating the sensor. The aforementioned statements apply to a case where the optical filter is situated relative to the incident light beam in such a way that the angle of incidence of the light on the optical filter measures 45°. An angle of 90° here arises between the incident and reflected light. Since it is simultaneously no longer necessary to use a second circuit board, the electrical connections required in prior art between the first circuit board and a second circuit board can be eliminated, which would have to be manually fabricated, and are thus error-prone. The assembly outlay is reduced as well, since all components can now be accommodated on a shared circuit board. Not least, the quality of signal transmission is improved. Finally, the configuration according to the invention also yields a more compact structural design for the distance measuring device, which is advantageous for accommodation in the housing of the cleaning device.

Another advantage to the inventive use of a band stop filter preferably designed as an interference mirror as an optical filter of the triangulation system involves the higher reflectance of the optical filter. By comparison to bandpass filters, which routinely exhibit a transmittance of at most 90% in relation to the mean frequency, band stop filters typically exhibit a reflectance of more than 90% in relation to the mean frequency. Within the meaning of the invention, it is recommended that a band stop filter with a reflectance of at least 90% be used, but preference goes to band stop filters with an even higher reflectance, for example 99% or 99.5% of the light intensity (in relation to the mean frequency). The higher reflectance in relation to the transmittance of a bandpass filter results in a higher intensity of the portion of light impinging upon the detector (given a constant intensity of the light emitted by the light source), so that even a weakly scattering or remote object can still be detected, and the distance can be measured.

As a rule, band stop filters (also referred to as band rejection filters) exhibit a reflection spectrum that displays a high reflectance not only at a single wavelength. Rather, the reflection spectrum routinely exhibits a high reflectance over a larger frequency range. Those spectral light components that do not fall within the highly reflective frequency range of the band stop filter are either transmitted or absorbed, and thus do not contribute to the reflected light component.

As a consequence, a reflectance of close to zero arises in the reflection spectrum of a band stop filter (x-axis: wavelength or frequency, y-axis: reflectance) in relation to wavelengths or frequencies outside of the reflection maximum. Defined in relation to the reflection spectrum are cutoff frequencies, namely an upper and lower cutoff frequency, in which the ratio of reflected light component to incident light component measures 70.7%, meaning that the reduction relative to the maximum value measures 3 dB. Derived from the latter as the filter variable is a so-called mean frequency, which forms the geometric mean of the upper and lower cutoff frequency. A band stop filter is usually selected in such a way that its cutoff frequency essentially corresponds to the wavelength of the used light. For example, if an optical structural design exhibits a laser diode with a wavelength of 785 nm, use is advantageously made of a band stop filter whose mean frequency corresponds essentially to this wavelength, i.e., to a mean frequency of roughly 380 THz.

It is proposed that the triangulation system exhibit two detectors, wherein a first detector is situated in the reflection direction relative to the optical [filter], so as to detect a first light component reflected by the optical filter, and wherein a second detector is situated in the transmission direction relative to the optical filter, so as to detect a second light component transmitted by the optical filter. In this embodiment, the second light component transmitted by the band stop filter is relayed to a second detector, which is situated on the side of the optical filter facing away from the first detector. The transmitted light impinging upon the second detector exhibits a wavelength lying outside of the reflection maximum of the band stop filter. In this regard, it is possible to evaluate a second system of the triangulation system that exhibits a second wavelength. For example, a source with at least two emission wavelengths can be used as the light source, or two or more light sources each with different emission wavelengths can be used, wherein the signal of the first wavelength is evaluated by the first detector, and the signal of the second wavelength is evaluated by the second detector. As a result, two or more triangulation systems can be realized using a shared optical system, wherein each of the triangulation systems can be optimized to a special distance measuring range. Since the light transmitted by the optical filter is perpendicular to the light reflected by the optical filter (at an angle of incidence of 45°), it is also necessary that the second detector be situated perpendicular to the first detector. This may require that the second detector be situated on a second circuit board that is perpendicular to the first circuit board, and must be connected with it in a conventional manner.

This embodiment is advantageously combined by placing a reflector in the propagation direction of the light between the optical filter and the second detector, which reflects the second light component transmitted by the optical filter to the second detector. The light component transmitted by the optical filter thus impinges onto the reflector, and is deflected by 90° by the latter at an angle of incidence for the reflector of 45° to the incident light. As a consequence, the light reflected by the reflector is also deflected to the first circuit board, so that the second detector can be situated there, and no second circuit board is required for accommodating the second detector. The first and second detector can thus be arranged next to each other on the first circuit board, wherein the light components reflected by the optical filter or reflector are aligned parallel to each other.

The reflector can also be a band stop filter. As a result, the reflector also exhibits a frequency range in which the latter reflects an especially high percentage of the incident light, namely preferably a percentage of at least 90%, preferably at least 99%, or especially preferably at least 99.5%. The mean frequency of the reflector here advantageously corresponds to at least a wavelength of the light component transmitted by the optical filter, so that the reflection spectrum of the reflector is optimally adjusted to the light impinging thereupon.

The reflector advantageously exhibits a reflection spectrum that has a mean frequency deviating from the reflection spectrum of the optical filter. For example, the reflection spectrum of the optical filter can exhibit a mean frequency corresponding to a wavelength of 785 nm, while the reflection spectrum of the reflector exhibits a mean frequency corresponding to a wavelength in the range of visible ambient light, for example 532 nm. In this regard, the distance measuring device can be used for evaluation in both the visible range and in a different range, e.g., the near infrared range in this case.

In addition, the reflector can exhibit a reflection spectrum that essentially exhibits two separate spectral ranges, as is the case for edge filters. For example, the reflector can be an edge filter that transmits light having a wavelength greater than 780 nm (long pass filter) and light having a shorter wavelength, in particular visible light.

It is recommended that the mean frequency of the optical filter correspond to a wavelength of the light emitted by the light source, and that the mean frequency of the reflector correspond to a wavelength of the visible ambient light, wherein the mean frequency of the optical filter preferably does not correspond to any wavelength of the visible ambient light. This configuration ensures that the two signals based on different wavelengths can separate from each other, and that a significant percentage of light of a specific wavelength is not reflected by both the optical filter and the reflector, for example. The intended goal is instead to separate the signals as precisely as possible and completely independently of the respective wavelength. It is here recommended in particular that the mean frequencies of the optical filter and reflector exhibit as great a spectral distance from each other as possible, preferably of at least 50 nm, and that the edges of the filter spectrum run as steeply as possible.

Within the meaning of the invention, the band stop filter can be an interference mirror, a semitransparent mirror or a reflection grating. When using selectively reflecting filters (band stop filters), it is advantageous that the latter achieve a higher reflectance than the transmittance reached by the bandpass filters in relation to selectively transmitting filters (bandpass filters), in particular in the case of interference mirrors or reflection gratings as the band stop filters.

As an alternative to the aforementioned configuration of the distance measuring device with a band stop filter as an optical filter, the invention proposes that the optical filter be a bandpass filter, with a reflector placed downstream from the latter in a transmission direction. This embodiment can also be used to deflect the light emitted by the light source in the direction of the circuit board, so that the detector can be situated on this circuit board, eliminating the need to use a second circuit board. Combining a bandpass filter with a reflector located behind the latter simulates the beam guidance of a band stop filter, but the reflectance of the combination is less than the reflectance of the band stop filter. In particular, the resultant reflectance of the combination depends on the transmittance of the bandpass filter and reflectance of the reflector. The transmittance of the bandpass filter is advantageously as high as possible, meaning that the reflectance is as low as possible, and the reflectance of the reflector is as high as possible. As mentioned above, conventional bandpass filters exhibit a transmittance of roughly 90% in relation to the mean frequency, so that the overall reflectance of the combination inevitably measures at most 90%. In this regard, it is recommended that a reflector having the highest possible reflectance be used, so as to further keep the losses for the light impinging upon the detector as low as possible.

As relates to the combination of a bandpass filter and reflector, it is recommended that the bandpass filter be an interference filter. It is here essential that the bandpass filter have the highest possible transmittance, i.e., the lowest possible reflectance, in relation to the mean frequency.

As an alternative to the above configurations of the distance measuring device with a band stop filter or bandpass filter as the optical filter, it is proposed that the optical filter be an edge filter with a reflectance of at least 90% in relation to at least one wavelength of the scattered light. This embodiment can also be used to deflect the light emitted by the light source in the direction of the circuit board, so that the detector can be situated on this circuit board, eliminating the need to use a second circuit board. The edge filter especially preferably exhibits a reflectance of at least 95%, or especially preferably of 98%, wherein the reflectance corresponds to the reflectance of a band stop filter starting at an amount of 98% or especially preferably of greater than 99.5%, and the light impinging upon the detector thus exhibits the highest possible intensity.

Finally, it is recommended in all cases that the distance measuring device exhibit only one circuit board for the arrangement of both the light source and the optical filter and detector or detectors.

The invention will be explained in greater detail below based on exemplary embodiments. Shown on:

FIG. 1: is a perspective view of a cleaning device according to the invention;

FIG. 2: is a bottom view of the cleaning device;

FIG. 3: is a distance measuring device according to a first embodiment;

FIG. 4: is a distance measuring device according to a second embodiment;

FIG. 5: is a distance measuring device according to a third embodiment;

FIG. 6: is a distance measuring device according to a fourth embodiment.

FIGS. 1 and 2 show an automatically displaceable cleaning device 1, here in the form of an electric motor-driven vacuuming robot. The cleaning device 1 exhibits a device housing 19, which among other things at least partially envelops two wheels 20, a cleaning roller 21, a brush 22 and a distance measuring device 2. In addition, the upwardly facing side of the device housing 19 has arranged on it a light outlet 23, through which light emitted by a light source 4 of the distance measuring device 2 can exit to the outside. The distance measuring device is arranged inside of the device housing 19 so that it can rotate by 360°, wherein the light outlet 23 is correspondingly thereto open by 360° in a horizontal outlet plane, so that light can exit in a 360° angular range. Located in front of the cleaning device 1 is an object 3, toward which the cleaning device 1 moves.

FIGS. 3 to 6 show four different embodiments of a distance measuring device 2. The distance measuring devices 2 each exhibit a light source 4, an optical filter 5 and a detector 6, which are arranged in an optical beam array in such a way that light emitted by the light source 4 (not depicted on FIGS. 3 to 6), which was scattered on the object 3, first impinges upon an optical system 13, for example a focusing lens, is then spectrally filtered by means of the optical filter 5, and finally detected at least in relation to a first light component 8 by a detector 6. The optical system 13, optical filter 5 and first detector 6 are here all situated on the first circuit board 11 of the distance measuring device 2.

The first circuit board 11 further exhibits a light barrier 14, here designed as a forked light barrier, which fixes the angular orientation of the distance measuring device 2 rotatably situated in the device housing 19. Also located on the first circuit board 11 are a voltage regulator 16, a processor 17 (microcontroller) and a laser driver electronic system 18. The first circuit board 11 also carries a measuring device housing 15, which holds the individual components of the distance measuring device 2.

In addition to the components described above, the distance measuring device 2 shown on FIG. 4 also exhibits a second detector 7, which is situated behind the optical filter 5 in the transmission direction of the light. The second detector 7 is located on a second circuit board 12, which is in turn carried by the first circuit board 11.

The distance measuring device 2 according to FIG. 5 exhibits a reflector 10 in the transmission direction of the optical filter 5, along with a second detector 7. The reflector 10 and second detector 7 are located on the first circuit board 11.

The distance measuring device 2 according to FIG. 6 exhibits a reflector 10 in the transmission direction behind the optical filter, along with a first detector 6. Both the reflector 10 and first detector 6 are located on the first circuit board 11.

The function of the individual distance measuring devices 2 will be explained below.

In the distance measuring device 2 shown on FIG. 3, the optical filter 5 is designed as a band stop filter. For example, the latter exhibits a reflectance of 99% in relation to its mean frequency, which here corresponds to the wavelength of an optical laser diode (light source 4) of 785 nm, for example. The optical filter 5 is here designed as a monochromatic filter, for example, so that the latter exhibits a sharp reflection maximum at 785 nm. The reflectance in relation to other wavelengths is close to zero. As a consequence, the light reflected by the object 3 gets onto the optical filter 5, and is reflected with a component, the first light component 8, of 99%. The remaining light component of 1% is absorbed or transmitted by the optical filter 5 (not depicted on FIG. 3), and does not get to the detector 6. The first light component 8 impinges upon the detector 6, and is there evaluated within the framework of optical triangulation. To this end, the distance measuring device 2 has the processor.

For example, the band stop filter is designed as an interference mirror, e.g., as a glass substrate with a multi-layer, dielectric coating. Depending on the desired reflectance and desired mean frequency of the band stop filter, use is to be made of various coating materials and potentially substrate materials as well. Other embodiments are also possible as an alternative to configuring the optical filter as a band stop filter, for example edge filters (long pass, short pass) or graduated filters. For example, the latter then exhibit a typical reflectance. In relation to an edge filter, the reflectance can measure at least 90%. The depicted optical beam path otherwise remains intact.

The wavelength-selective reflection of the optical filter 5 can separate the light emitted by the light source 4 from the ambient light of the distance measuring device 2, which is scattered by the object 3 to be measured as well, and thus also impinges upon the optical system 13 and optical filter 5. As a consequence, the wavelength-dependent reflectance is used to separate the light of the light source 4 from the ambient light, so that the light of the light source 4 contributes to the measurement result exclusively or to a predominant extent in relation to the ambient light.

FIG. 4 shows another embodiment of the invention. A second detector 7 is therein located behind the optical filter 5 in the transmission direction of the optical filter 5, and designed to detect the light transmitted by the optical filter 5. In this embodiment, the light emitted by the light source and hence also reflected by the object 3 exhibits at least two different wavelengths. A first wavelength here corresponds to the mean frequency of the optical filter 5, so that the corresponding first light component 8 is reflected by the optical filter 5, and impinges upon the first detector 6. A second light component 9, in relation to which the optical filter 5 only exhibits a slight reflectance, is transmitted by the optical filter 5 and gets to the second detector 7. The second detector 7 is also connected with the processor 17, and can be evaluated according to detector 6. In addition, the second detector 7 can also be used to detect ambient light and/or to detect a light component transmitted by the optical filter 5, which exhibits a wavelength corresponding to the mean frequency. At a reflectance of 98%, this transported percentage measures 2%, for example.

Both the first detector 6 and the second detector 7 can be designed as photodiodes, photodiode arrays and/or CCD-/CMOS-chips. The detectors 6, 7 can here additionally only detect in relation to individual wavelengths or specific wavelength ranges, so that wavelength selection can additionally take place.

According to the depicted embodiment, it is thus possible for the detector 6 to measure the light of a first wavelength, for example 785 nm, while the second detector 7 measures light with a deviating wavelength, for example 532 nm. As a consequence, the light reflected by the object 3 can be measured in relation to two different wavelengths, making it possible to acquire additional information about the object, in particular the color of its surface. This can be advantageous in particular for objects 3 that exhibit only a slight reflectance in relation to specific wavelengths or wavelength ranges owing to their surface properties, so that one of the detectors 6, 7 could only detect a low light intensity, for example.

The exemplary embodiment according to FIG. 5 shows a distance measuring device 2 that also exhibits an optical filter 5 and a first detector 6. As also already explained in relation to the preceding figures, the optical filter 5 is designed as a band stop filter, so that the latter reflects the light reflected by the object 3 onto the detector 6 at a very high reflectance in relation to the mean frequency, for example of 99.5%. The second light component 9 transmitted by the optical filter 5, which exhibits wavelengths deviating from the mean frequency of the optical filter 5, impinges upon the reflector 10, which at least partially reflects it. The reflector 10 can also be a band stop filter, which advantageously exhibits a mean frequency that deviates from the mean frequency of the optical filter. As an alternative, the reflector 10 can also be designed as a broadband reflector, which exhibits an approximately high reflectance over a large frequency range. The light reflected by the reflector 10 impinges upon the second detector 7, and can there be evaluated. According to this embodiment, both the first detector 6 and the second detector 7 are situated on the first circuit board 11, so that no second circuit board 12 is necessary. The reflector 10 can be a metallic mirror, an interference mirror comprised of dielectric layers, or also a reflection prism. The surfaces of the reflector 10 and optical filter 5 are preferably planar, but can also be microstructured, as is the case for a Fresnel lens or lenslet. Alternatively, the optical filter 5 can also involve an edge filter, for example, which can exhibit a lower reflectance (but one measuring at least 90%).

FIG. 6 shows another embodiment of the invention, in which the distance measuring device 2 first exhibits an optical filter 5 designed as a bandpass filter and then a reflector 10 behind the optical system 13 in the propagation direction of the light reflected by the object 3. The optical filter 5 designed as a bandpass filter is configured in such a way as to transmit light corresponding to the wavelength of the light source 4. The bandpass filter exhibits a high transmittance in relation to this wavelength, for example one measuring 90%. The first light component 8 transmitted by the bandpass filter impinges upon the reflector 10, which has a high reflectance in relation to the wavelength of the first light component 8. The light reflected by the reflector 10 impinges upon the first detector 6, and is evaluated by means of the processor 17. The bandpass filter can be a transmission prism, a transmission grating, a beam splitter or also a lenslet array, which consists of a plurality of individual lenses. According to this embodiment, the components of the distance measuring device 2 are also situated on a shared circuit board, namely the first circuit board 11, thus eliminating the need for a second circuit board 12. As opposed to the embodiments described above, the light intensity of the first light component 8 impinging upon the first reflector 6 is lower, since the transmittance of the optical filter 5 is less than the reflectance of conventional band stop filters.

Even though the distance measuring device 2 was here described as being rotatable by 360°, it is of course also possible that the latter be non-rotatably arranged inside of the device housing 19. In such an embodiment, distance measurements can only be performed in a specific direction (e.g., the current traveling direction of the cleaning device 1).

REFERENCE LIST

1 Cleaning device
2 Distance measuring device
3 Object
4 Light source
5 Optical filter 6 First detector
7 Second detector
8 First light component
9 Second light component
10 Reflector
11 First circuit board
12 Second circuit board
13 Optical system
14 Light barrier
15 Measuring device housing
16 Voltage regulator
17 Processor
18 Laser driver electronic system
19 Device housing
20 Wheel
21 Cleaning roller
22 Brush
23 Light outlet

The invention claimed is:

1. An automatically displaceable cleaning device (1), with a distance measuring device (2) for measuring the distance of the cleaning device (1) from an object (3), wherein the distance measuring device (2) exhibits an optical triangulation system with a light source (4), an optical filter (5) and a detector (6), which are arranged in such a way that light emitted by the light source (4) in the propagation direction is first scattered by the object (3), wherein at least a portion of the scattered light is subsequently spectrally filtered by the optical filter (5), and wherein the filtered light is finally detected by the detector (6), wherein the optical filter (5) is a band stop filter with a reflectance of at least 90% in relation to at least one wavelength of the scattered light.

2. The cleaning device (1) according to claim 1, wherein the triangulation system exhibits two detectors (6, 7), wherein a first detector (6) is situated in a reflection direction relative to the optical filter (5), so as to detect a first light component (8) reflected by the optical filter (5), and wherein a second detector (7) is situated in a transmission direction relative to the optical filter (5), so as to detect a second light component (9) transmitted by the optical filter (5).

3. The cleaning device (1) according to claim 2, wherein a reflector (10) is placed in a propagation direction of the light between the optical filter (5) and the second detector (7), which reflects the second light component (9) transmitted by the optical filter (5) to the second detector (7).

4. The cleaning device (1) according to claim 3, wherein the reflector (10) is a band stop filter.

5. The cleaning device (1) according to claim 4, wherein the mean frequency of the optical filter (5) corresponds to a wavelength of the light emitted by the light source (4), and wherein the mean frequency of the reflector (10) corresponds to a wavelength of the visible ambient light, wherein the mean frequency of the optical filter (5) does not correspond to any wavelength of the visible ambient light.

6. The cleaning device (1) according to claim 3, wherein the reflector (10) exhibits a reflection spectrum that has a mean frequency deviating from the reflection spectrum of the optical filter (5).

7. The cleaning device (1) according to claim 1, wherein the band stop filter is an interference mirror.

8. The cleaning device (1) according to one of the claim 1, wherein the distance measuring device (2) exhibits only one circuit board (11) for the arrangement of both the light source (4) and the optical filter (5) and detector (6, 7).

* * * * *